United States Patent [19]

Liebler

[11] 4,112,252
[45] Sep. 5, 1978

[54] MULTI-TERMINAL SERIALLY COMMUNICATING SHARED LOGIC TEXT EDITING SYSTEM

[75] Inventor: Jerome E. Liebler, Milford, Mich.

[73] Assignee: Omnitext, Inc., Ann Arbor, Mich.

[21] Appl. No.: 734,236

[22] Filed: Oct. 20, 1976

[51] Int. Cl.$^2$ .............................................. H04L 5/14
[52] U.S. Cl. .......................... 178/58 R; 179/15 BS; 343/179
[58] Field of Search ............... 358/141, 142, 145, 148; 179/15 BS, 2 TV, 2 TS, 2 DP; 340/324 AD; 178/58 R; 343/179

[56] References Cited

U.S. PATENT DOCUMENTS

| | | | |
|---|---|---|---|
| 3,691,295 | 9/1972 | Fisk | 178/58 R |
| 4,013,836 | 3/1977 | Williams | 179/15 BS |

Primary Examiner—Robert L. Richardson
Attorney, Agent, or Firm—Krass & Young

[57] ABSTRACT

A text editing system is provided in which a central station communicates a video signal, timing signals, and control signal to a remote station by way of a single communication pathway for subsequent display on a cathode ray tube at the remote station and wherein keyboard information may be communicated from the remote station to the central station across the same communication pathway. The video signal from the central station includes conventional horizontal and vertical synchronization pulses which are encoded prior to transmission to the remote station and decoded at the remote station. In addition, the video signal is inhibited during both the horizontal and vertical synchronization pulses so that during the horizontal synchronization pulse, keyboard information from the remote station may be communicated to the central station across the communication pathway while during the vertical synchronization period control signals may be communicated from the central station to the remote station via the communication pathway.

11 Claims, 7 Drawing Figures

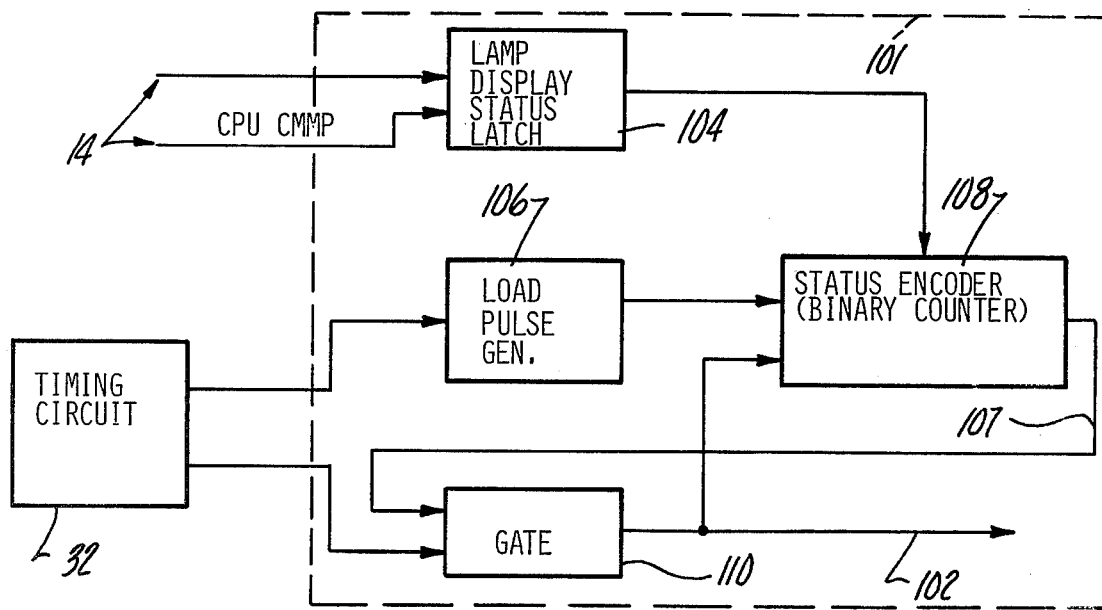
Fig-4
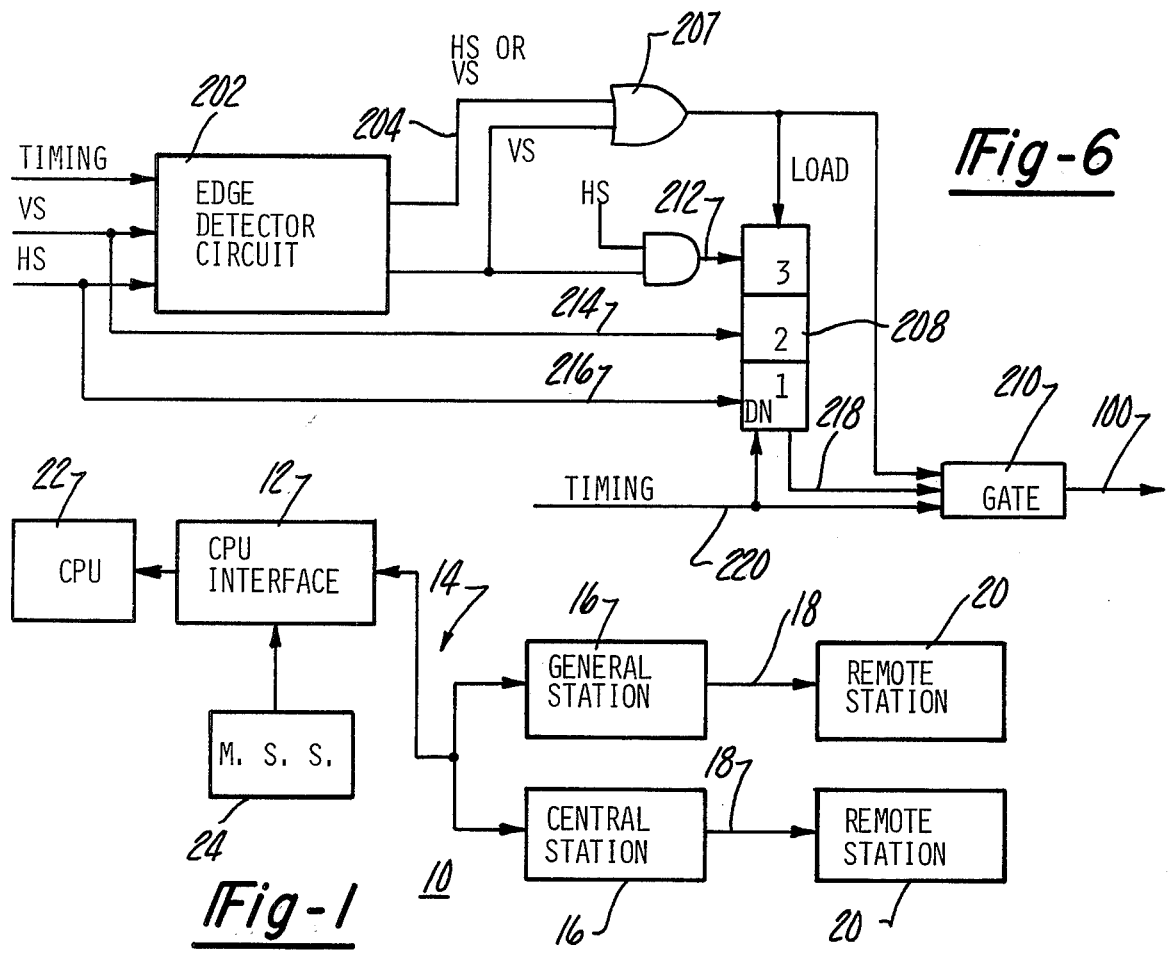
Fig-6
Fig-1

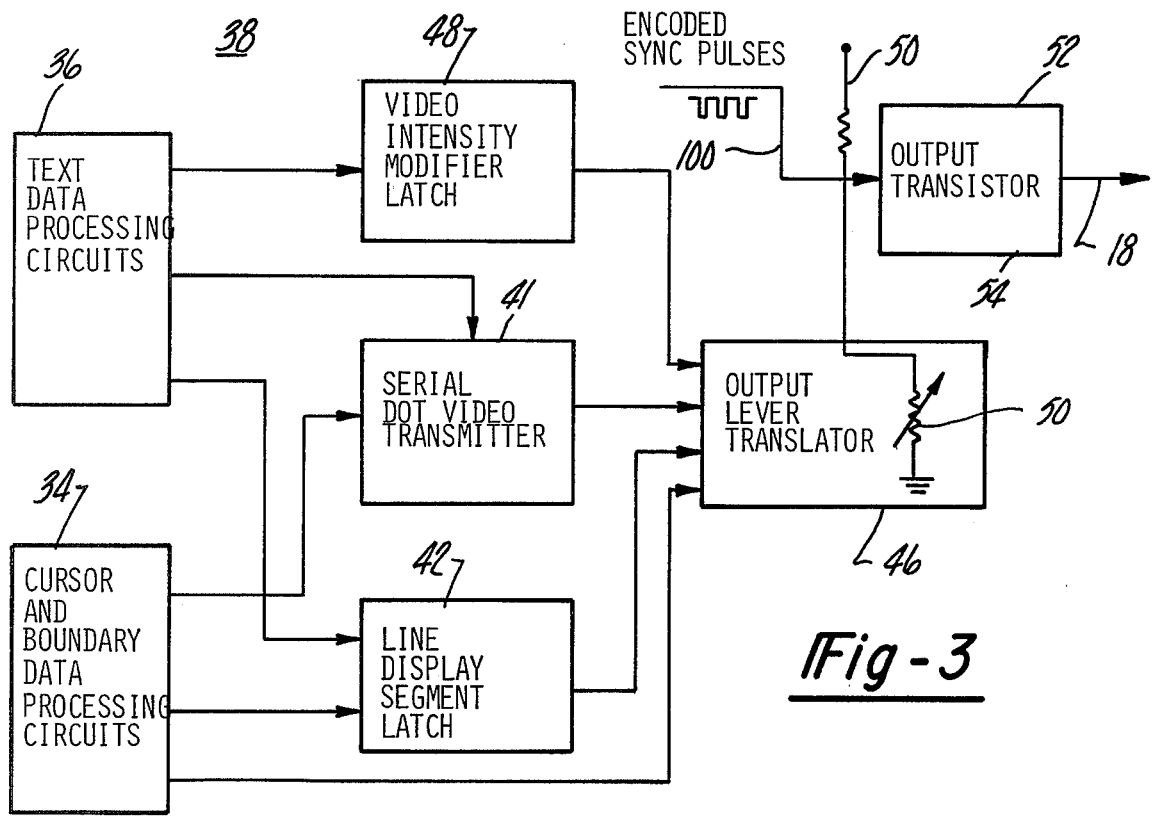

MULTI-TERMINAL SERIALLY COMMUNICATING SHARED LOGIC TEXT EDITING SYSTEM

BACKGROUND OF THE INVENTION

I. Field of the Invention

The present invention relates generally a text editing system in which a central station communicates video information to a plurality of remote work stations having CRT monitors for displaying the video signal, and more particularly, to a novel system for communicating a plurality of diverse information between the central and a remote station across a single communications pathway.

II. Description of the Prior Art

There are many previously known systems, such as text editing systems, in which a central processer communicates with a plurality of remote stations. In such systems, the remote station typically includes a CRT monitor for displaying a video signal received from the central station, a keyboard for entering command signals to the central station, and may further include error indicators and the like.

Previously it has been the practice to run an electrical line between the central and remote stations for each different type of signal communicated between the stations. Consequently, the video signal, the vertical and horizontal synchronization signals, the keyboard information, and the like each would require at least one, if not several, separate electrical lines between the central and remote stations. As the complexity of the information transferred between the central and remote stations has increased, with the previously known systems it has been necessary to run a multicore electrical cable between the central and remote station which has proven particularly disadvantageous when the remote station is positioned far from the central station.

Another disadvantage of the previously known systems, is that as the complexity of the information transferred between the central and remote stations has increased, the cost, size, and complexity of the remote stations have likewise increased. Consequently, maintenance costs for the remote stations in addition to the necessity of heavy duty power lines and the like have rendered the cost of the remote stations nearly prohibitive.

SUMMARY OF THE PRESENT INVENTION

The present invention obviates the above-mentioned disadvantages of the previously known text editing systems and the like by providing a system of communication between the central and remote stations in which a video signal and control signals are communicated from the central to the remote station along a single communication pathway and in which keyboard information is communicated from the remote station to the central station along the same communication pathway.

In brief, the central station generates a video signal, which may comprise textual information, having conventional horizontal and vertical synchronization signals. The video signal is serially fed along the communication pathway to the remote work station wherein the video signal is displayed on a cathode ray tube (CRT) monitor. The video signal is inhibited or blanked during the synchronization pulses in the well known manner, and the synchronization pulses are encoded into a series of shorter pulses which define not only the initiation and type of synchronization pulse, but also define the scanning field, i.e., whether an odd or even frame is being transmitted to the remote work station. At the remote work station, the encoded synchronization signals are decoded into vertical and horizontal synchronization pulses which are fed to the CRT monitor.

During the vertical synchronization pulse and while the video signal is inhibited, an encoded control signal comprising a series of pulses may be transferred from the control station to the remote station. The encoded control signal is of a different polarity than the encoded synchronization signal to differentiate it therefrom. The encoded control signal is decoded at the remote work station and is adapted to activate a plurality of indicator lamps, or the like, at the remote station.

The remote work station includes a keyboard which generates a multi-bit, digitally encoded keyboard word stored in a storage register upon the depression of a keyboard key. One bit of the keyboard word is fed along the communication pathway to the central station during each horizontal synchronization pulse following a vertical synchronization pulse and preferably an additional bit of the keyboard word is indicative of the power status of the remote station and communicated to the central station. In this manner the central station may sample, continuously or as desired, the power status of the remote station.

The system of the present invention thus permits a video signal, including the conventional horizontal and vertical synchronization pulses, and a control signal to be fed from the central station to the remote station along a single communication pathway while keyboard data information may be fed along the same communication pathway from the remote work station to the central station for further processing. It should also be apparent that the remote work station is in the sense an idiot station in that no processing whatsoever is performed at the remote station. This construction, however, is advantageous in that the overall complexity of the remote work station is greatly reduced in respect to the previously known remote stations.

BRIEF DESCRIPTION OF THE DRAWINGS

A better understanding of the present invention will be had upon reference to the following detailed description when read in conjunction with the accompanying drawing in which:

FIG. 1 is a block diagrammatic view showing a text editing system utilizing the communication system of the present invention;

FIG. 3 is a block diagrammatic view showing the video output circuits from the central station for the communication system of the present invention;

FIG. 4 is a block diagrammatic view showing the central station control signal encoder and transmitter for the communication system of the present invention;

FIG. 6 is a block diagrammatic view showng the central station encoding logic for the video synchronization signals for the communication system of the present invention; and FIG. 7 is a pulse diagram showing the video signal synchronization scheme for the communication system of the present invention.

DETAILED DESCRIPTION OF THE PRESENT INVENTION

Figure 2:
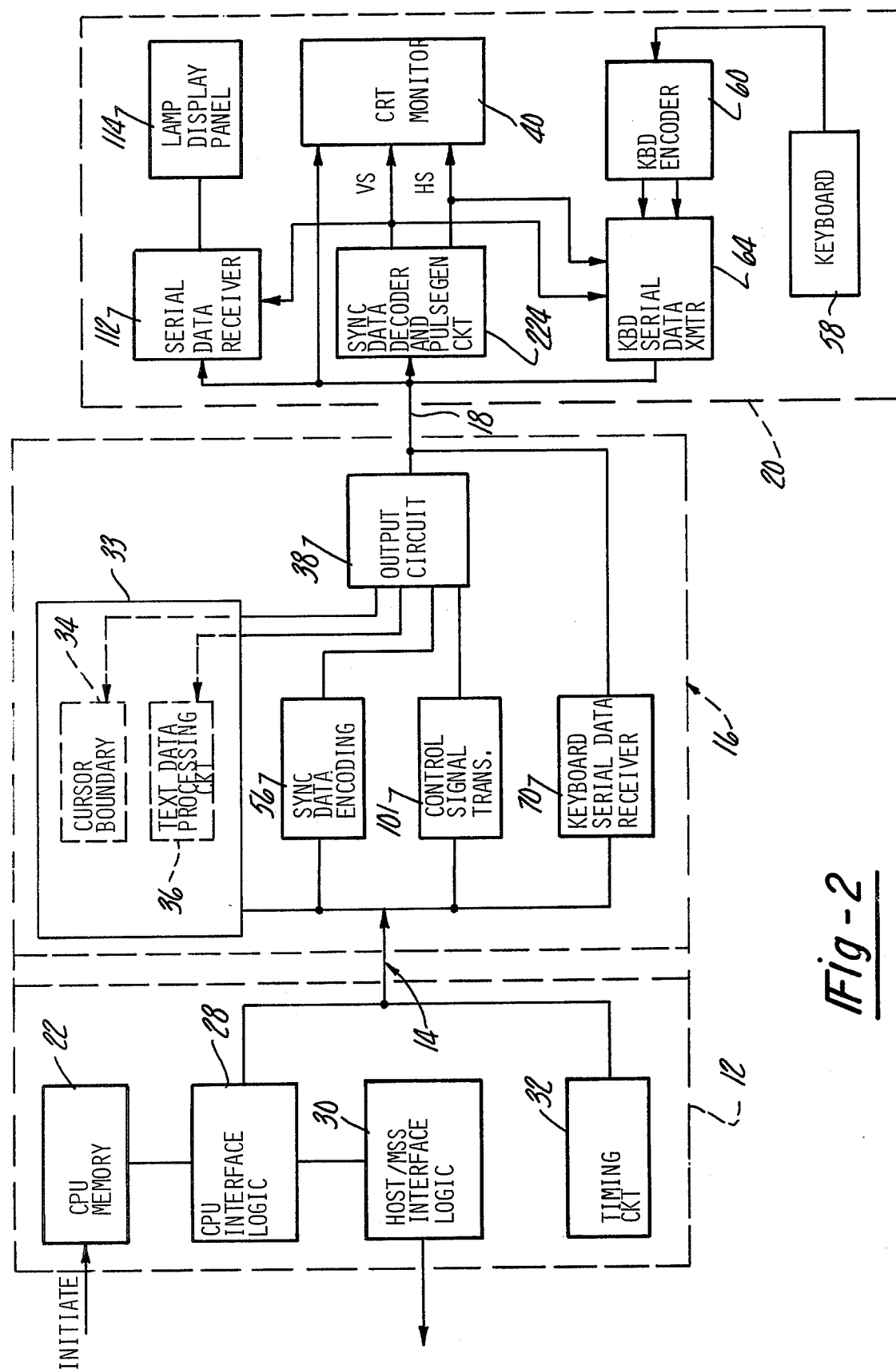
FIG. 2 is a block diagrammatic view similar to FIG. 1 but expanded in detail and with parts removed for clarity.

Referring to FIG. 1, a greatly simplified block diagrammatic view of a text editing system 10 is thereshown and comprises a central processing unit (CPU) 12 which communicates via a data bus 14 with a plurality of central stations 16. In a manner which forms the novelty of the present invention and which will be hereinafter described in much greater detail, each central station 16 communicates along a single communication pathway 18 with a remote station 20. Although not important to the present invention, physically the central stations 16 are preferably located adjacent to each other and to the CPU 12 to minimize the length of the data bus 14 and also to utilize common power supply lines and timing circuits. Data, such as textual data, is stored in a memory 22 coupled with the CPU 12, and in addition, a mass storage system 24 may also communicate with the CPU 12 to store larger amounts of textual data.

Referring now to FIG. 2, an expanded block diagram is shown illustrating the CPU circuitry 12, a single central station 16, and a remote station 20. The CPU 12 and memory 22 is coupled through a CPU interface 28 to the data bus 14 while a second interface 30 provides the interface beween the mass storage system 24 and the data bus 14. A timing circuit 32 provides the required timing pulses for the text editing system 10 and in addition generates both the horizontal and vertical synchronization pulses for a cathode ray tube monitor which will be later described in greater detail. It will also be understood that the data bus 14 communicates control, status and timing signals between the CPU 12 and the central station 16 in addition to textual data.

The central station 16 illustrated in FIG. 2 comprises an interpretative display processor 33 such as is described in U.S. Pat. No. 3,848,232 issued to Leiber et al. on Nov. 12, 1974 and which is of common ownership as the present invention. Accordingly, and for the sake of brevity, a full description of the display processor 33 will not be here repeated and reference should instead be had to the Leiber patent. In brief, however, the display processor 33 includes a cursor and boundary data processing circuit 34 in combination with a text data processing circuit 36 which feeds into an output circuit 38 for subsequent transmission to the remote station 20. The circuits 34 and 36 generate signals to produce a video image on a CRT monitor 40 at the remote station 20. Although the video signal preferably comprises textual information, other types of video signals may be displayed on the CRT monitor 40 without departure from the spirit of the invention.

An examplary output circuit 38 is illustrated in FIG. 3 in which appropriate timing signals, including the video blanking singal have been omitted for clarity. A character dot code from the text data processing circuit 36 is fed in parallel along lines 39 into a serial dot video transmitter 41 which comprises an eight bit serial register with parallel input and serial output. The cursor and boundary data processing circuit 34 feeds edge data into the serial input of the dot video transmitter 41 and also top and bottom boundary video information into a line segment display latch 42 in order to underline the display on the CRT monitor 40. A cursor underline video signal is also fed into the display segment latch 42 while the cursor underline is fed directly to an output level transmitter 46 which will be shortly described. For the sake of completeness a video intensity modifier latch 48 is provided to alter the intensity of the CRT display and receives input from the text data processing circuit 36. The intensity modifier latch 48 output is fed into the output level translator 46.

The cursor character video signal, the output from the intensity modifier latch 48, the output from the line display latch 42 and the serial dot video output of the video transmitter 41 all form the inputs to the translator 46 which comprises a four line to eight-line decoder with a related resistance network 50 illustrated in schematic. The translator 46 mixes its four inputs and varies the voltage at the base 52 of an output transistor 54 in accordance with the inputs to the translator 46. The output of the translator 54 is fed directly into the common communication pathway 18 and transmitted to the remote station 20.

As is well known in the art, both a vertical and a horizontal synchronization signal or pulse must be provided to the CRT monitor in order to properly synchronize the video image display on the CRT monitor 40 with the video image transmitted from the central station 16. The horizontal and vertical synchronization pulses are generated by the timing circuit 32 and are fed into a synchronization data encoding circuit 56. The synchronization signals are illustrated in FIG. 7 and, as shown, the horizontal synchronization signal comprises a series of pulses wherein one voltage pulse occurs at the end of each horizontal scan. The vertical synchronization pulse is of a comparatively longer duration than the horizontal synchronization pulse but only occurs after its lowermost horizontal scan on the monitor 40. As can also be seen in FIG. 7, during an even frame the leading edge of the vertical synchronization pulse coincides with the leading edge of the horizontal synchronization pulse and likewise the trailing edge of the vertical synchronization pulse coincide with the leading edge of a subsequent horizontal synchronization pulse. Conversely, during an odd frame both the leading and trailing edges of the vertical synchronization pulse lie between horizontal synchronization pulses. It is this inherent feature of the cathode ray synchronization pulses that permits the synchronization pulses to be encoded and fed along the common communication pathway 18 in a manner according to the present invention.

Since both keyboard data from the remote station 20 and control signals from the central station 10 are transmitted along the common communication pathway 18 in a manner to be later described, it is necessary not only to differentiate the CRT synchronization pulses from other types of data crossing the communication pathway 18, but also to fee the communication pathway 18 following the start of a synchronization period for the transmission of these other data. In order to differentiate the synchronization signals or other types of data on the communication pathway 18, the synchronization signals are fed along a line 100 FIG. 3 thereby turning off the output transistor 54 which results in the transmission of negative pulses along the communication pathway 18. Since all other data on the communication pathway 18 is of a positive voltage, the negative polarity of the synchronization pulses effectively differentiates the synchronization pulses from other types of data on the communication pathway.

In order to free the communication pathway for the transmission of other data, the synchronization encoding circuit 56, which is more clearly shown in FIG. 6, is provided to encode the synchronization pulses into a series of short pulses, hereinafter called the encoded synchronization pulses thereby freeing the remainder of the synchronization pulses period for the transmission of other data.

Referring now to FIG. 6, the synchronization encoding circuit 56 includes an edge detector circuit 202 having the vertical synchronization pulse (VS) and the horizontal synchronization pulse (HS) forming the inputs to the edge detector circuit 202. The edge detector circuit 202 senses the leading and trailing edges of HS and VS and generates a pulse along line 204 when the leading edge of either HS or VS is sensed. Likewise, the circuit 202 generates a signal along line 206 when the trailing edge of VS is encountered. Lines 204 and 206 form the input of an OR gate 207 which generates a load pulse to down counter 208 and simultaneously enables a gate circuit 210.

The down counter 208 includes at least three parallel inputs 212, 214, and 216, or one input per counter bit. HS forms the input 216, VS forms the input 214, and the trailing edge of VS anded with HS forms the input 212. Referring to both FIGS. 6 and 7, the initiation of a horizontal synchronization pulse, without a vertical synchronization pulse, only line 216 is high so that only the first bit of the counter 208 is loaded at the leading edge of HS or VS. During even frame encoding, at the leading edge of the vertical synchronization pulse, both lines 214 and 216 are high so that two bits of the counter 208, or a binary three is loaded into the counter 208.

During the odd frame encoding, the leading edge of the vertical synchronization pulse does not coincide with the horizontal synchronization pulse, in contrast to that described above. Consequently, at the leading edge of VS only line 214 is high so that a binary two is loaded into the counter 208. Similarly, at the trailing edge of VS, only line 212 is high so that a binary four is loaded into the counter 208. In this manner, the count in the counter 208 effectively differentiates the odd frame from the even frame synchronization encoding.

As previously described, a gate circuit 210 is enabled during each load pulse from the OR gate 207. A serial output 218 from the counter 208 (which is inhibited when the counter down counts to zero) forms another input to the gate circuit 210 and likewise a timing line 220 forms still another input to both the gate circuit 210 and the down count input of the counter 208. Consequently, for each pulse from the timing line 220, the count in the counter 208 is decremented and one pulse is generated along the gate circuit output line 100. As has been previously described, the output line 100 is coupled to the output transistor 54 in the output circuit 38 so that each pulse along line 222 results in the generation of a negative voltage pulse along the common communication pathway 18 to the remote station 20. The encoded synchronization pulses and the counter load pulses from the OR gate 207 are illustrated diagrammatically in FIG. 7.

The encoded synchronization pulses are sensed by a synchronization data decoder and pulse generator 224 (FIG. 2) at the remote station 20 which counts the negative voltage pulses from the pathway 18 and generates VS and HS to the CRT monitor 40 in response thereto. Although the synchronization data decoder and pulse generator 224 may comprise any of several well known circuits, in practice essentially the reverse of the synchronizaton data encoding circuit 56 has proven to be satisfactory.

Like most text editing systems, the text editing system 10 of the present invention is interactive with an operator and for this purpose a keyboard 58 (FIG. 2) provided at each remote station 20. The keyboard 58 is coupled with a keyboard encoder 60 at the remote station 20 which generates a digitally encoded signal, such an 8 bit word, representative of the key on the keyboard 58 which has been depressed. IN addition, the keyboard decoder generates a strobe singal along line 62 whenever a key is depressed. The encoded key data is fed into the first 8 bits of a 10 bit shift register in keyboard serial data transmitter 64 while the ninth bit of the shift register indicates the presence or absence of a strobe signal from line 62. The tenth bit of the shift register in the keyboard serial data transmitter 64 is indicative of the power status of the remote station 20; for example, the tenth bit of the shift register may be set to a binary one if the remote station 20 is turned on, and conversely, may be zero if the remote station 20 is turned off. In addition, the CRT vertical synchronization signal is fed to the keyboard serial data transmitter 64 along line 66 while the horizontal synchronization signal is fed to the transmitter 64 along line 68 and the keyboard transmitter 64 includes circuitry (not shown) so that the tenth bit of the shift register is reset in accordance with the power status of the remote station 20 during any tenth horizontal synchronization pulse following a video synchronization pulse for a reason to become shortly hereinafter apparent.

Immediately following the termination of each CRT vertical synchronization pulse, the keyboard information contained in the shift register in the keyboard transmitter 64 is serially transmitted along the communication pathway 18 to a keyboard serial data receiver 70 located in the central station 12 in the following manner. Following the vertical synchronization pulse, and during each horizontal synchronization period, the video signal from the text display processor 33 is inhibited and 1 bit from the 10 bit shift register in the keyboard transmitter 64 is transmitted along the communication pathway 18 to the keyboard receiver 70. Consequently, one keyboard entry, the strobe signal bit, and the power status bit from the remote station 20 are transferred to the keyboard receiver 70 for the 10 horizontal synchronization pulses following a vertical synchronization pulse.

Figure 5:
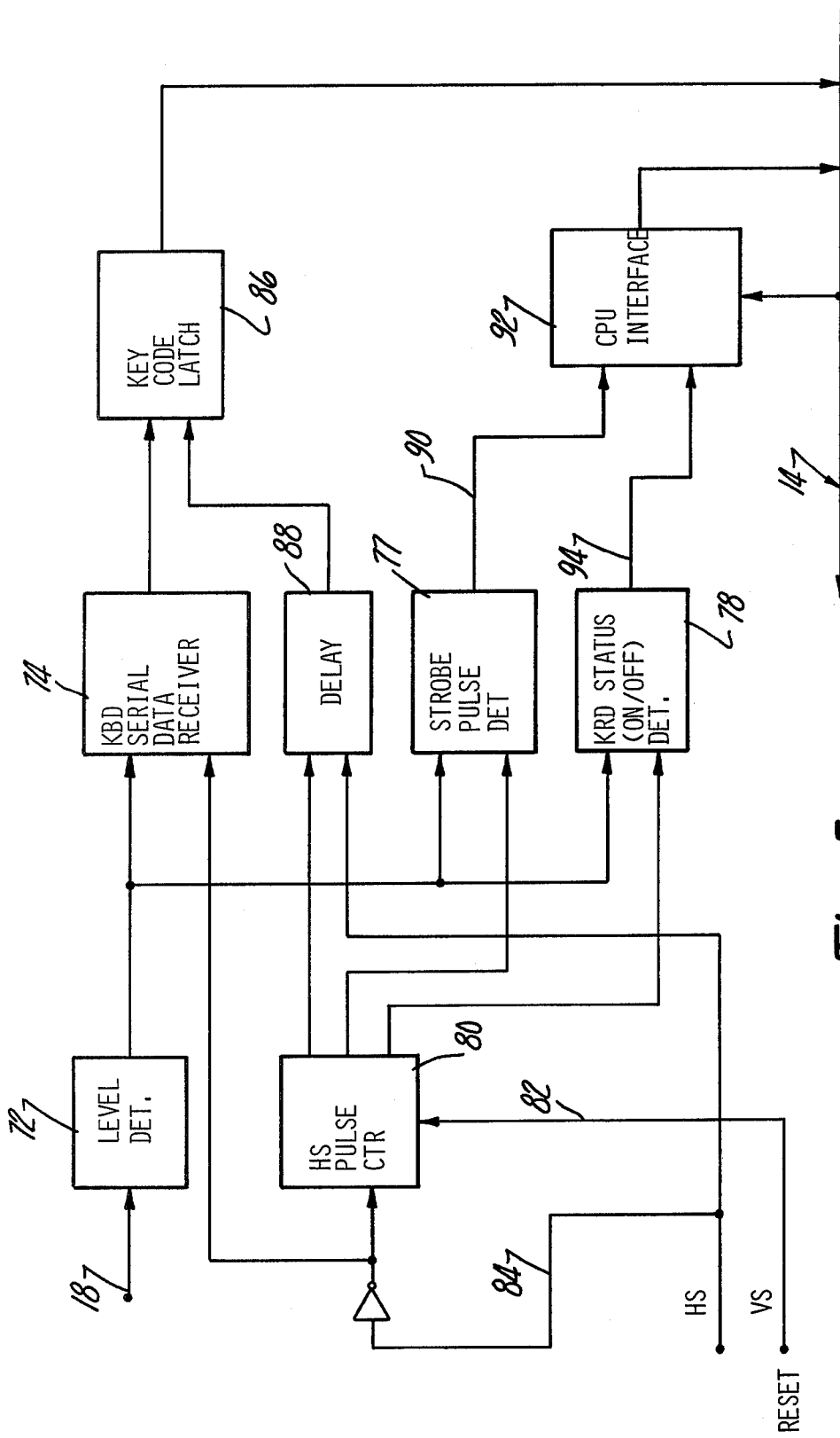
FIG. 5 is a block diagrammatic view showing the central station keyboard data processing circuits for the communication system of the present invention.

An exemplary keyboard serial data receiver 70 is illustrated in FIG. 5 and comprises a level detector 72 with an input directly connected to the common communication pathway 18. The level detector 72 which may comprise an operational amplifier, has its output connected to an 8 bit shift register 74, a strobe pulse detector 76, and a keyboard power status detector 78. The shift register has a serial input and parallel outputs which form the inputs of a key code latch 86. The keyboard receiver 70 includes a 4 bit counter 80 which is reset by line 82 at the trailing edge of the synchronization pulse and which is continuously incremented by the trailing edge of each horizontal synchronization pulse along line 84. When an 8 count is achieved in the counter 80, the key code latch 86 is activated through a delay 88 so that the first 8 bits from the shift register 74 of keyboard information are latched into the key code latch 86. As will be remembered, the 8 bits of information in the key code latch 86 are representative of key character which was depressed on the keyboard 58.

A strobe pulse detector 77 has one input from the level detector output 72, as has been previously described, and one input from the counter 80 which is active when the counter 80 reaches the count of 9. Consequently, the detector 76 generates an output along line 90 when a strobe pulse is present to a CPU interface 92. The presence of an output signal on line 90 is indicative that an entire keyboard character has been read into the key code latch 86.

The keyboard power status detector 78 has one input from the level detector 72, as has been previously described, and one input from the counter 80 which is active when the counter 80 reaches the count of 10. In this manner, the keyboard power status detector 78 senses the 10th, or power status bit, from the keyboard serial data transmitter, and generates a signal along line 94 to the CPU interface 92 indicative of the power status of the remote station 20. The key outputs from the code latch 86 and the CPU interface 92 are coupled to the data bus 14 for further processing by the CPU 12. It should also be remembered at this time that the 10th bit of the shift register in the keyboard serial data transmitter 64 at the remote station 20 is set during each 10th horizontal synchronization pulse following a vertical synchronization pulse. Consequently, the power status of the remote station 20 may be continuously sampled at the central station 16 by means of the keyboard power status detector 78. It should also be remembered that the circuit for the keyboard serial data receiver 70 illustrated in FIG. 5 is by way of example only in that other circuits may be used to implement the invention of the present application.

As has been heretofore described, the video signal from the control station 16 to the remote station 20 is inhibited or blanked during both the horizontal and vertical synchronization periods. As just described, keyboard information from the remote station 20 is serially transmitted across the communication pathway 18 to the control station 16 during the horizontal synchronization pulses. Conversely, during the vertical synchronization pulses, which are of a comparatively longer period of time than the horizontal synchronization pulse, control signals may be transmitted to the central station 18 to the remote station 20.

In addition, although the control signal may be used for a variety of different purposes, for exemplary purposes it is assumed that the control signals are utilized to illuminate one or more lamps of six indicator lamps at the remote station 20. The indicator lamps may comprise, for example, error indicators or other types of signals relevant to the operator at the remote station.

Referring to FIGS. 2 and 4, a control signal transmitter 101 is shown having a plurality of inputs from the data bus 14 and an output line 102 which forms an input to the output circuit 38. The control signal transmitter 101 includes a six bit latch 104 which is preloaded with data from the data bus upon command from the CPU 12. A load pulse generator 106 transfers the information contained within the latch 104 in parallel into a 6 bit binary down counter 108. The counter 108 produces a serial output along line 107 which is fed into a gate 110 and which is inhibited upon the occurrence of an underflow of the binary down counter 108. The timing pulse from the circuit 32 forms the other input to the gate 110 and the output of the gate 110 is fed not only into the output circuit 38 via line 102 but also into the down count or clock input of the counter 108. Consequently, the down counter 108 is decremented until an underflow occurs in the counter 108. At that time, the line 107 is inhibited thereby disabling the gate 110 and terminating the output pulses along line 102. In this manner, immediately following the initiation of a vertical synchronization pulse, a plurality of pulses, equal in number to the number initially preloaded in the latch 104, are serially transmitted from the transmitter 101 to the remote station 20 via the pathway 18. Since both the latch 104 and the down counter 108 are 6 bits in length, anywhere from 0 to 63 pulses may be transmitted to the remote station 20 via the pathway 18.

At the remote station 20, the pulses from the control data transmitter 101 are received by a serial data receiver 112 which is enabled during the vertical synchronization period. The serial data receiver 112 essentially comprises a 6 bit counter having a serial input and parallel outputs. Consequently, the receiver 112 merely counts the number of pulses generated by the serial data transmitter 101 so that at the termination of the vertical synchronization period, the count in the 6 bit counter in the serial data receiver 112 is identical to the count originally in the transmitter latch 104. Each of the parallel outputs of the serial data receiver 112 are coupled to lamp drivers and subsequently to a lamp display panel 114 at the remote station 20. Each bit of the receiver counter controls the status or illumination of an individual lamp on the lamp display panel 114. Consequently, by the selection and transmission of an appropriate binary number of pulses from the control station 16 to the remote station 20, any combination of the lamps on the display panel 114 may be illuminated.

It can thus be seen that the present invention provides a novel means for transmitting a video signal, synchronization signals, and control signals from a central station to a remote station and for transferring keyboard information from the remote station to the central station along a single communication pathway. The present system thus permits a centralization of much of the complex circuitry required for a text editing system or the like and provides a simple connection between each remote and central station so that additional stations may be easily added onto the system and likewise physically moved.

Having thus described my invention, many modifications thereto will become apparent to those skilled in the art to which it pertains without deviation from the spirit of the invention as defined by the scope of the appended claims.

What is claimed is:

1. A system for bi-directional serial communication along a single communications pathway between a central station and remote station, said communication including a data signal and at least two synchronization signals, said system comprising:
   means for encoding said synchronization signals at said central station,
   means for decoding said synchronization signals at said remote station,
   means for inhibiting said data signal during said synchronization signals,
   means for transferring a control signal from said central station to said remote station during one of said synchronization signals, and
   means for transferring information from said remote station to said central station during the other of said synchronization signals.

2. The system as defined in claim 1, wherein said remote station comprises a cathode ray tube monitor and said data signal is a video signal and adopted to produce an image on said monitor, and wherein said first synchronization signal is a vertical synchronization signal and said second synchronization signal is a horizontal synchronization signal.

3. The system as defined in claim 1, wherein said encoded synchronization signals are of opposite polarity from said data signal to thereby differentiate said encoded synchronization signals from said data signal.

4. The system as defined in claim 1, wherein said remote station includes a keyboard and a multibit storage register for storing digitally encoded character information entered onto said keyboard wherein one bit from said storage register is transferred across said communication pathway to said central station during each of said other synchronization signals.

5. A system for transmission of video informatin from a central station to a remote station and return transmission of electrical signals first from the remote station to the central station along a single transmission line, said video information comprising a video signal, horizontal synchronization pulses and vertical synchronization pulses, said system comprising:
means for encoding said horizontal and vertical synchronization pulses at said control station, and
means for decoding said horizontal and vertical synchronization pulses at said remote station, and
means for transmitting first electrical signals from said remote station to said central station along said transmission line, wherein said first electrical signals are of an opposite polarity from said encoded synchronization signals.

6. The system as defined in claim 5, wherein said first electrical signals are transmitted from said remote station to said central station using one of said synchronization periods.

7. The system as defined in claim 6, and including means for transmitting second electrical signals from said central station to said remote station wherein said second electrical signals are of an opposite polarity from said encoded synchronization signals, and means for receiving said second electrical signals at said remote station wherein said second electrical signals are transmitted from said central station to said remote station during the other of said synchronization period.

8. The system as defined in claim 7, wherein said means for transmitting further comprises means for serially generating a plurality of electrical pulses along said transmission line and wherein said means for receiving comprises a binary counter adapted to count said electrical pulses.

9. The system as defined in claim 7, and further comprising a plurality of indicator means at said remote station, wherein each of said indicator means is electrically coupled to a bit in said binary counter so that each indicator is selectively activated in dependence on the state of its respective binary counter bit.

10. The system as defined in claim 6, wherein said first electrical signals are binary encoded and stored in a multibit counter at said remote station, wherein one bit from said multibit counter is transmitted from said remote station to said central station during each of a predetermined number of horizontal synchronization periods following each vertical synchronization period.

11. The system as defined in claim 10, wherein one bit of said multibit counter is representative of the power status of said remote station.

* * * * *